Patented Dec. 8, 1936

2,063,027

UNITED STATES PATENT OFFICE 2,063,027

PROCESS FOR PREPARING FORMYLAMINO ANTHRAQUINONES AND PRODUCTS OBTAINABLE BY SAID PROCESS

Edwin C. Buxbaum, Shorewood, Wis., assignor to E. I. du Pont de Nemours & Company, Wilmington, Del., a corporation of Delaware No Drawing. Application January 18, 1936, Serial No. 59,693

8 Claims. (Cl. 260—60)

This invention relates to an improved process for preparing formylamino-anthraquinones and to new compounds obtainable by such process.

Formylamino-anthraquinones have heretofore been prepared by the reaction of amino compounds with formic acid. This method, however, is not suitable where the amino-anthraquinone corresponding to the particular formylamino-anthraquinone compound desired is not obtainable or where the cost of preparing it is prohibitive.

The objects of the present invention are, therefore, to prepare new and useful formylamino-anthraquinone compounds, to provide a process for preparing such new compounds and an improved process for the preparation of formyl-amino-anthraquinone compounds generally.

I have found that formylamino-anthraquinones of high quality can be prepared in good yields by reacting upon a halogen-anthraquinone with formamide. The reaction is preferably carried out in the presence of an acid-binding agent and a copper catalyst. This process is applicable to both alpha- and beta-halogen-anthraquinones which may or may not carry substituents in the adjacent alpha or beta position as well as in the opposite benzene ring of the anthraquinone molecule. Where there are two halogen atoms present in the anthraquinone molecule one or both may be replaced by the formylamino group. By this process new compounds may be prepared which serve as valuable intermediates for dyestuffs and which are themselves valuable as direct dyes for cellulose acetate silk and related fibers.

The following examples are given to more fully illustrate my invention. The parts used are by weight.

Example 1

25 parts of 1-chloro-anthraquinone, 5 parts of potassium acetate, 0.5 part of basic copper acetate and 100 parts of formamide are heated together in a suitable container at a temperature of 135° C. until no more unchanged chloro-anthraquinone is present. The mixture is then diluted with 500 cc. hot water, filtered and washed. The material obtained is substantially pure 1-formylamino-anthraquinone.

Example 2

25 parts of 1,5-dichloro-anthraquinone are mixed with 5 parts potassium acetate, 0.5 part basic copper acetate and 200 parts of formamide. The mixture is heated to a temperature of 120–130° C. until no further change takes place. The mixture is then cooled and diluted with 800 parts of water. The precipitated 1,5-diformyl-amino-anthraquinone is isolated by filtering.

Example 3

22 parts of 1,5-di(methylamino)-4,8-dibromo-anthraquinone obtained by bromination of 1,5-di-(methylamino)-anthraquinone are mixed with 100 parts of formamide, 0.3 part of basic copper acetate and 10 parts each of sodium carbonate and sodium acetate. The mixture is heated at 180–185° C. for one hour or until no unchanged starting material remains. The product is isolated as in the above examples. This compound dyes cellulose acetate violet shades.

Example 4

50 parts of 1-methylamino-4-bromo-anthraquinone, 10 parts of potassium acetate, 5 parts of sodium carbonate, 0.5 part of copper chloride and 150 parts of formamide are heated to 100–110° C. for sixteen hours. The mixture turns to a violet color and is isolated by drowning in water and filtering. The resulting 1-methyl-amino-4-formylamino-anthraquinone dyes cellulose acetate in violet shades.

Example 5

25 parts of 1-N-methyl-4-bromo-anthra-pyridone are heated with 200 parts of formamide, 5 parts of potassium acetate, 2.5 parts of potassium carbonate and 0.5 part of copper acetate at 135° C. The reaction is continued until all of the bromine has been replaced, the mass then is diluted with 800 parts of water, filtered and washed.

Example 6

100 parts of 1-amino-2,4-dibromo-anthraquinone are heated with 400 parts of formamide, 20 parts of potassium acetate, 10 parts of sodium carbonate and 2 parts of copper acetate at 120–130° C. until the brown mass changes to a violet color. The mixture is then diluted with water and filtered. The isolated 1-amino-2-bromo-4-formylamino-anthraquinone dyes cellulose acetate in bluish-red shades.

Example 7

If the materials given in Example 6 are heated to a temperature of 150–160° C. until the brown mass changes to violet and then brown again, the second bromo atom is replaced and 1-amino-2,4-diformylamino-anthraquinone is obtained. This compound is soluble in sulfuric acid with a deep red-brown color which changes to a dull red shade with the addition of paraformaldehyde.

Example 8

50 parts of 1-chloro-2-methyl-anthraquinone are mixed with 1.0 part of copper chloride, 5 parts potassium carbonate and 10 parts potassium acetate. 200 parts of formamide are added and the mixture heated to 130° C. until the mass is brownish in color and all the chlorine has been replaced. The product is isolated in the usual manner and consists of 1-formylamino-2-methyl-anthraquinone.

Example 9

250 parts of formamide are mixed with 50 parts of 1,3-dibromo-2-amino-anthraquinone, 15 parts of sodium acetate, 15 parts of sodium carbonate and 1.0 part copper acetate. The mixture is heated at 150–155° C. for fifteen hours. The mixture is isolated by diluting with 750 parts of ethyl alcohol and filtering. The cake is washed with hot water until alkali free and dried. The 1-formylamino-2-amino-3-bromo-anthraquinone has a melting point of 291–292° C.

Example 10

105 parts of 1-amino-2-methyl-4-bromo-anthraquinone are suspended in 400 parts of nitrobenzol. To this suspension are added 20 parts of sodium carbonate, 20 parts of sodium acetate, 1 part of copper acetate and 30 parts of formamide. The mixture is heated to 120–125° C. for sixteen hours until the red-brown mixture has changed from bright red to a dark violet shade. When the reaction has been completed, the mass is cooled to 80° C. and 800 parts of ethyl alcohol are added. The diluted mass is cooled to 30° C. and filtered. The cake is steam distilled and the 1-amino-2-methyl-4-formylamino-anthraquinone is isolated by filtration. The compound dissolves in organic solvents with a red color. It dyes cellulose acetate in red shades.

Example 11

100 parts of 1-amino-2-methyl-4-bromo-anthraquinone are mixed with 400 parts of formamide, 20 parts of sodium carbonate, 12.5 parts of anhydrous sodium acetate and 1.0 part of copper acetate. The mixture is heated to 150–155° C. under good agitation. Vigorous evolution of ammonia soon sets in and the mass changes to a red color. Heating is continued until the evolution of ammonia stops and all of the bromine has been replaced. The reaction mass is then poured with stirring into 3000 parts of cold water. The resulting compound is isolated by filtering and washing. It dyes cellulose acetate in red-brown shades of excellent fastness to light.

Example 12

100 parts of chlor quinizarine are suspended in 400 parts of formamide to which have been added 25 parts of sodium acetate, 20 parts of sodium carbonate and 1 part of copper acetate. The mixture is heated to 180° C. until the reaction mass turns brown in color. When the reaction is complete, the mixture is isolated in the usual manner by pouring into water, filtering and washing. The compound obtained dyes cellulose acetate in orange-red shades.

The replacement of the halogen atoms by the formylamine groups may be carried out at temperatures between about 100–185° C., preferably at about 135–150° C. Where a primary amino group is present in the halogen-anthraquinone molecule in an alpha position, temperatures below 150° C. should be employed, for higher temperatures such as 160–180° C. tend to effect the condensation of the formamide with the amino group, thereby resulting in undesirable impurities.

The condensation may be carried out in various solvents, such as toluene, dichlorobenzene, nitrobenzene, etc., or it may be carried out in an excess of formamide which itself serves as a diluent for the reaction mass.

Sodium carbonate, sodium bicarbonate or similar alkaline agents may be used as acid binders. The presence of an alkali metal acetate, however, in addition to the carbonate or bicarbonate aids the reaction. As disclosed, the acetates may be used alone as acid binding agents and to otherwise facilitate the reaction. Copper salts, such as copper acetate, copper chloride, etc. catalyse the reaction, and the addition of such salts materially aids in carrying out the condensation.

In general, the formylamino compounds have been found to have good affinity for cellulose acetate silk and related fibers, and the compounds above described may be used for the direct dyeing of such material.

I claim:

1. The process for preparing formylamino-anthraquinone compounds which comprises reacting on a halogen-anthraquinone with formamide.
2. The process which comprises heating a halogen-anthraquinone with formamide in the presence of an acid binding agent.
3. The process which comprises heating a halogen-anthraquinone with formamide in the presence of an acid binding agent and a copper catalyst at a temperature between 135–150° C.
4. The process which comprises heating an alpha-halogen anthraquinone with formamide in the presence of an acid binding agent and a copper catalyst at a temperature between 135–150° C.
5. The process which comprises heating a 1-halogen-anthraquinone containing an amino radical in the 4-position with formamide in the presence of an acid binding agent and a copper catalyst at a temperature between 135–150° C.
6. A 1-formylamino-4-amino-anthraquinone carrying in the 3-position a substituent of the class consisting of $CH_3$ and Br.
7. 1-formylamino-3-methyl-4-amino-anthraquinone.
8. 1-formylamino-3-bromo-4-amino-anthraquinone.

EDWIN C. BUXBAUM.